Oct. 23, 1956  R. J. PERDUE  2,767,798
MOUNTING STRUCTURE FOR WINDMILL PROPELLER
Filed March 15, 1954  3 Sheets-Sheet 1

INVENTOR
Robert John Perdue

Oct. 23, 1956 R. J. PERDUE 2,767,798
MOUNTING STRUCTURE FOR WINDMILL PROPELLER
Filed March 15, 1954 3 Sheets-Sheet 3

INVENTOR
Robert John Perdue

United States Patent Office 2,767,798
Patented Oct. 23, 1956

2,767,798

MOUNTING STRUCTURE FOR WINDMILL PROPELLER

Robert John Perdue, Potters Bar, Middlesex, England, assignor to De Havilland Propellers Limited, Hatfield, England Application March 15, 1954, Serial No. 416,335

Claims priority, application Great Britain March 17, 1953

2 Claims. (Cl. 170—62)

The present invention relates to anemo-electric power plants which utilise the effect exerted by the wind upon the blades of a propeller, to cause rotation of the said propeller, and thereby to generate electric power. The invention relates more particularly to power plants of the kind which are operated on the so-called depression principle.

In this kind of power plant the blades of the propeller are hollow and are provided with apertures at their tips. The interior of each blade communicates, via an air-tight passage through its root and through the boss of the propeller, with the outlet of an air turbine which is coupled to an electric generator. When the wind velocity is of a value sufficient to cause rotation of the propeller, the air within the hollow blades is induced, by reason of the centrifugal force generated by its own mass, to flow out through the said apertures in the blade tips, thereby forming a depression i. e. a pressure lower than that of the surrounding atmosphere, within the hollow blades. The air within the air-tight passages and the air turbine is then at a higher pressure than that of the air remaining within the blades and there is therefore established a continuous flow of air through the air turbine, the air-tight passages, the interiors of the blades and out through the said apertures. The flow of air through the air turbine supplies the power to drive the electric generator.

The propeller of an anemo-electric power plant is preferably provided with pitch change means for adjusting the pitch angle of the blades in accordance with the velocity of the wind. Such pitch change means may for example be responsive to the propeller speed or generator output, but is preferably responsive to the axial thrust acting on the propeller due to the wind. One form of construction of a propeller, pitch change means and supporting structure whereby the pitch angle of the blades is controlled by the axial thrust, the said axial thrust remaining substantially constant throughout the operative range of wind velocities, is described in our co-pending application Serial No. 416,320, filed March 15, 1954.

In addition, the blades of the propeller of an anemo-electric power plant are preferably adapted for coning or flapping about their roots, each blade being pivoted about an axis substantially perpendicular to its own longitudinal axis and to the propeller axis. The blades are biased towards the central portion of the coning range by suitable spring mechanism and any sudden gust of wind has the effect of momentarily coning the blades, thereby preventing the gust of wind exerting an excessive axial thrust on the propeller.

The object of the invention is to provide a construction of propeller which will allow the pitch angle of the blades to be adjusted and the blades themselves to be coned and which provides a substantially air-tight passage between the interior of the propeller hub and the interior of the propeller blades.

According to the invention there is provided a propeller suitable for use with an anemo-electric power plant of the kind described and comprising blades adapted for both coning and change of pitch angle, wherein each blade is mounted in a cradle for rotation about a pitch change axis and each cradle is mounted in the propeller boss for pivoting about a coning axis, co-operating surfaces between the blade and the cradle and between the cradle and the boss being substantially airtight to provide a substantially air-tight passageway between the interior of said blade and he interior of the propeller boss.

A propeller according to the invention will now be described by way of example with reference to the accompanying drawing, in which.

Figure 1:
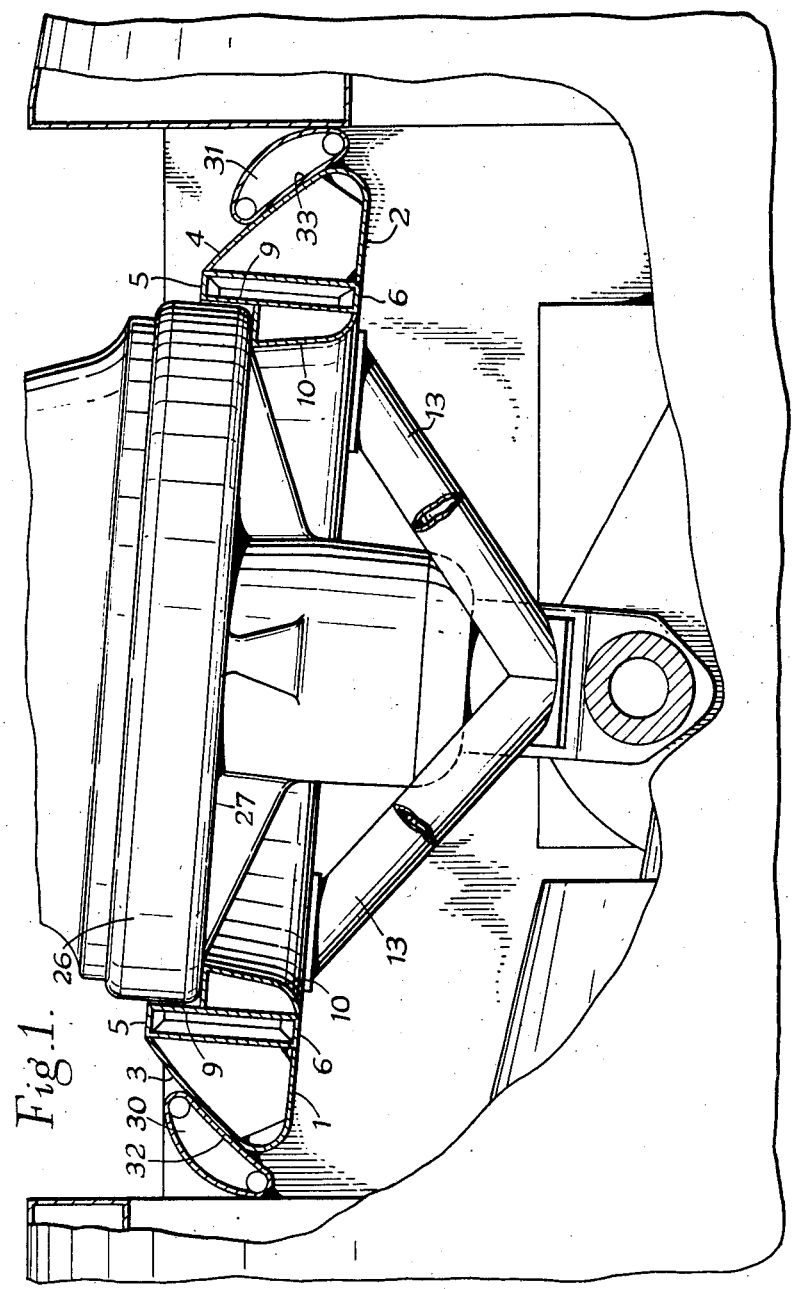
Fig. 1 is a cut-away side view of part of the propeller boss, illustrating in section the sealing cradle and sealing surfaces of the propeller boss.
Figure 2:
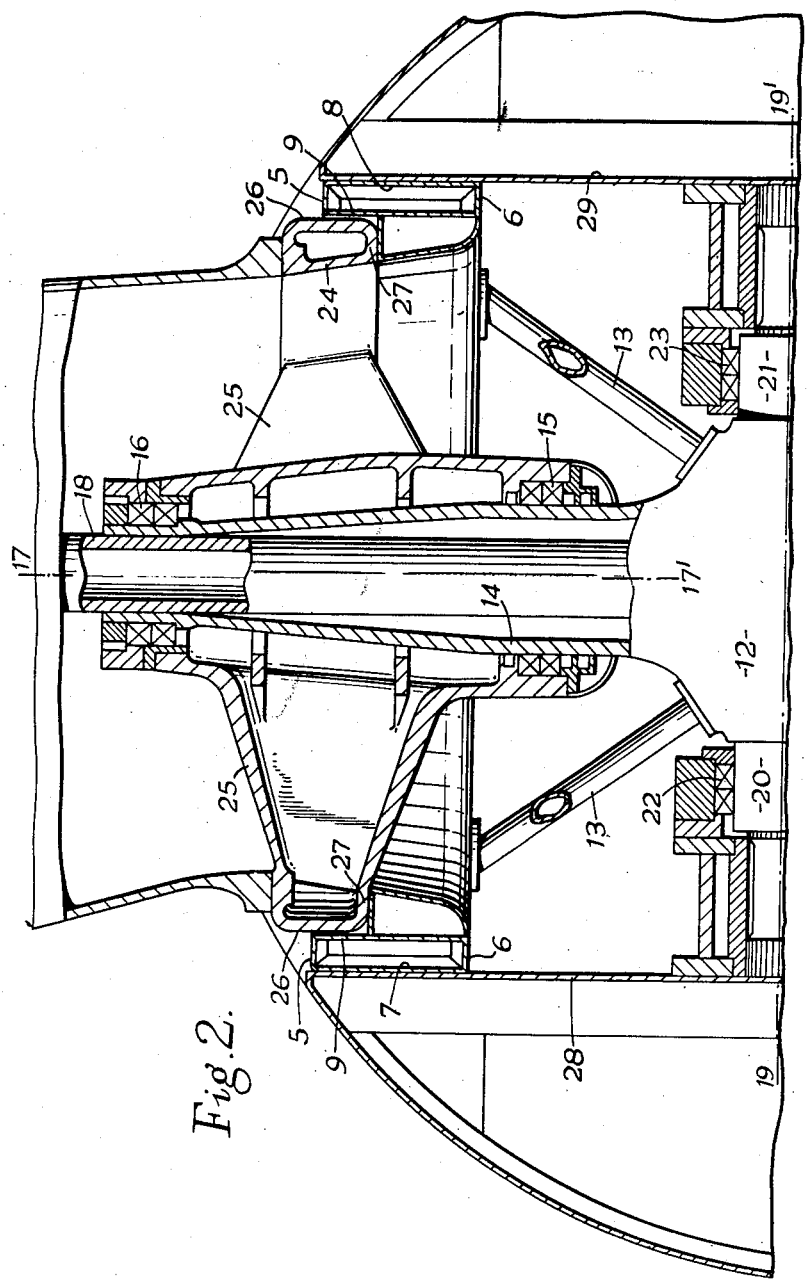
Fig. 2 is a sectional end view of part of the propeller boss.
Figure 3:
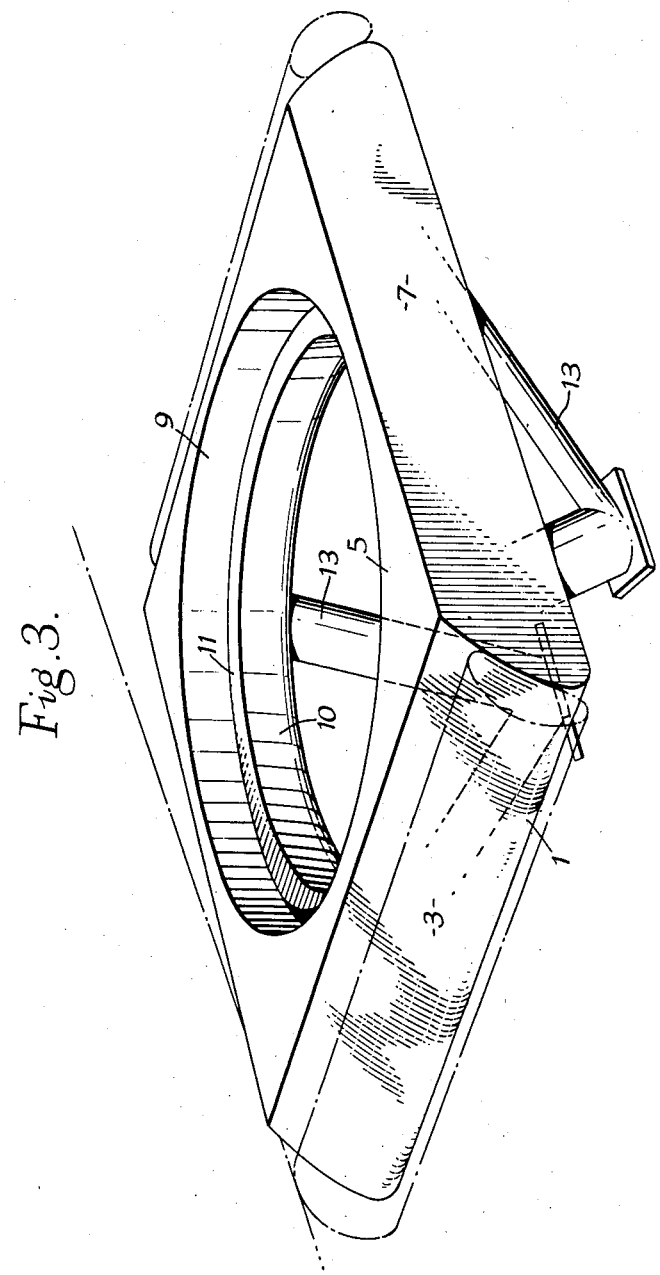
Fig. 3 is a perspective view of the sealing cradle.

As shown in the drawings, the sealing cradle comprises two curved end plates 1, 2 providing part cylindrical outer surfaces 3, 4 respectively, and flat rectangular outer and inner plates 5, 6 extending between the outer and inner ends respectively of the plates 1, 2. Two flat side plates 7, 8 interconnect the side edges of the plates 1, 2, 5 and 6. The cradle is provided with a sheet metal cylinder 9 centrally located in the cradle at right angles to the plates 5, 6 and extending into co-operating apertures formed in said plates 5, 6, and the inner portion of the cylinder 9 is provided with a projecting flange member 10 having an outer surface 11 projecting at right angles from the inside wall of the cylinder 9.

The cradle is secured to a stub axle support 12 by means of stays 13 connected to the plate 6 and the said support. The stub axle comprises a hollow shaft 14 on the external surface of which are located two sets of roller bearings 15, 16 upon which the blade of the propeller is supported for pivoting around a pitch change axis 17—17'. A control member 18 controlling the angle of pitch of the blade is supported on thrust bearings (not shown) located on the internal surface of the hollow shaft 14 and a portion of the member 18 protrudes beyond the outer end of the stub axle and is rigidly secured to the propeller blade.

The stub axle support 12 is pivotably mounted about a coning axis 19—19' by two laterally projecting co-axial shafts 20, 21 journalled in roller bearings 22, 23 mounted within the propeller boss. The support 12 also encloses a hydraulic motor (not shown) suitable for rotating the member 18 about the pitch change axis 17—17'.

The root end of the blade comprises a metal ring 24 supported on the arms of a spider 25. The ring 24 provides two adjacent right angled surfaces 26, 27, the surface 26 forming the outer periphery of the ring and the surface 27 forming an annular area at the end of the blade. When the blade is mounted in position within the cradle, the surfaces 26 and 27 co-operate with the inside wall of the cylinder 9 and with the surface 11 of the member 10, respectively to provide a substantially air-tight seal between the root end of the blade and the cradle. The co-operating surfaces may be machined during manufacture to within very fine limits in order to provide an air-tight seal or alternatively the co-operating surfaces may be provided with sealing strips of rubber or other suitable material.

The aperture in the propeller boss for the reception of the cradle is bounded by two flat side plates 28, 29 disposed parallel to one another at right angles to the coning axis 19—19' and by two end elements 30, 31 having inwardly facing curved surfaces 32, 33. The radius of curvature of the surfaces 3, 4, 32 and 33 are located on the coning axis 19—19' and when the cradle is mounted in position in the propeller boss the surfaces 3, 4 co-operate with the surfaces 32, 33 respectively and the outside surfaces of the plates 7, 8 co-operate with the facing surfaces of the plates 28, 29 respectively to provide a substantially air-tight seal between the cradle and the propeller boss. The last mentioned co-operating surfaces may be machined during manufacture to within very fine limits or they may be provided with sealing strip to provide an air-tight seal.

It is to be understood that one cradle as above described is provided for each propeller blade. The coning operation can evidently be effected entirely independently of any change of pitch angle, whilst maintaining effective sealing against the entry of air into the blades other than via the passage leading from the turbine to the blades.

I claim:

1. A propeller comprising a hollow propeller boss, a plurality of hollow blades, individual supports for each of said blades, each blade being mounted with respect to its support for rotational movement about its pitch change axis and each support being mounted within said boss for pivotal movement about a coning axis of the associated blade, and a cradle surrounding the root portion of each blade, each cradle being secured to the associated blade support and having sealing surfaces co-operating with surfaces on said boss and having further sealing surfaces co-operating with surfaces on the associated blade to provide a substantially airtight passageway between the interior of the blade and the interior of said boss.

2. A propeller as set forth in claim 1 wherein each support includes a stub axle and each blade includes a spider roatably mounted upon the stub axle and having an outer surface co-operating with said further sealing surfaces to provide an airtight seal between the blade and the cradle.

References Cited in the file of this patent

UNITED STATES PATENTS

| 2,429,646 | Pullin | Oct. 28, 1947 |
| 2,485,543 | Andreau | Oct. 25, 1949 |

FOREIGN PATENTS

| 497,675 | Canada | Nov. 17, 1953 |
| 908,631 | France | Apr. 15, 1946 |